May 27, 1930. W. P. KIERNAN 1,760,413
ZIRCONIUM AND PREPARATION THEREOF
Filed Sept. 16, 1926
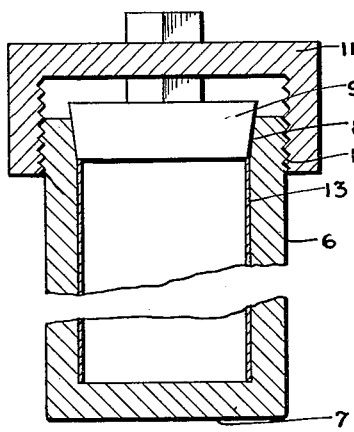
Fig. 1.
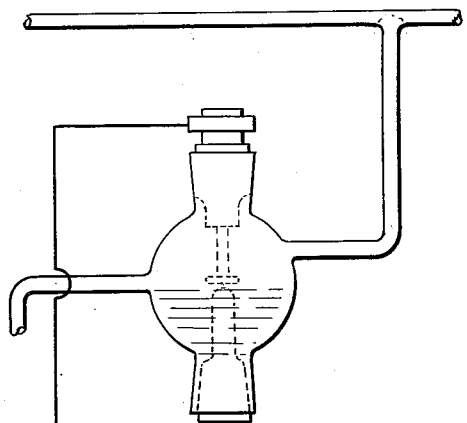
Fig. 2.
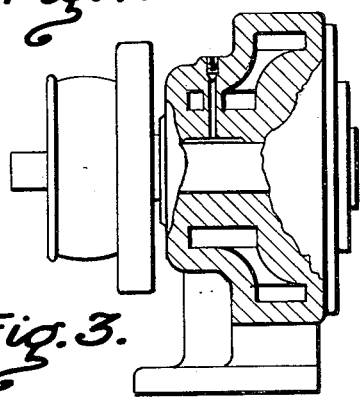
Fig. 3.
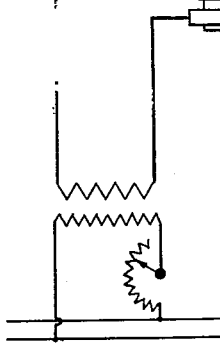
Fig. 4.
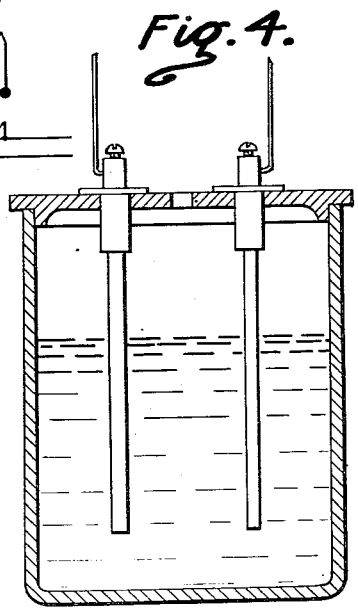
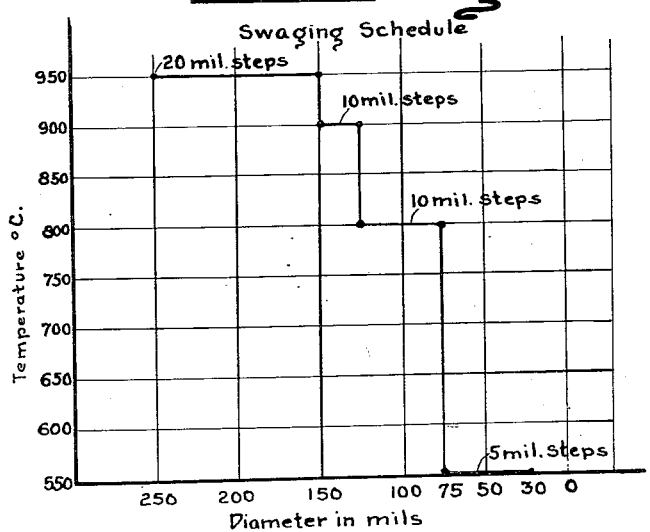
Fig. 5.
William P. Kiernan
INVENTOR
BY 
ATTORNEY Patented May 27, 1930

1,760,413

UNITED STATES PATENT OFFICE

WILLIAM PHILIP KIERNAN, OF EAST ORANGE, NEW JERSEY, ASSIGNOR TO WESTINGHOUSE LAMP COMPANY, A CORPORATION OF PENNSYLVANIA

ZIRCONIUM AND PREPARATION THEREOF

Application filed September 16, 1926. Serial No. 135,821.

This invention relates to a method of manufacturing zirconium capable of being mechanically worked, and to the products produced thereby.

Zirconium as an element has long been known in the arts and since the time of its discovery in 1789 by Klaproth many efforts have been made to manufacture zirconium in a coherent homogeneous state and in such condition of purity that it could be fabricated by mechanical working into suitable commercial forms. Zirconium is regarded in the literature as a brittle non-plastic metal, however, I have found that this material when rendered coherent and homogeneous and free from substances affecting the workability of the metal, may be deformed by mechanical working into commercial shapes. I have further ascertained that the material obtained by me possesses the remarkable property of being extremely soft at low temperatures. For example, I have successfully swaged at a red heat relatively large bars of this metal of 250 mil. size in large steps to approximately 40 mil. diameter.

In preparing zirconium metal capable of being mechanically deformed I have found it essential to eliminate substantially all impurities and to secure this end I have utilized the process set forth in detail in application Serial No. 717,940, filed June 5, 1924 and assigned to the same assignee as the present application. In addition, I have also followed the heat-treating method described in the said application and application Serial No. 432,325, filed December 21, 1920, and assigned to the same assignee as the present application.

The process I have found to be most effective in obtaining workable zirconium comprises three stages, each of which contributes its influence upon the other in order to make the ultimate result possible. These stages briefly stated are (1) the production of a substantially pure powder which is relatively coarse, (2) the agglomeration under high pressure and the sintering or heat-treatment of the metal powder to form a dense, coherent and homogeneous body, and (3) the mechanical working of the coherent metal at suitable temperatures and under properly controlled conditions to obtain useful shapes of the metal.

In describing my process reference may be made to the accompanying drawings in which:

Fig. 1 is a vertical sectional view of a bomb employed in the manufacture of the metal powder;

Fig. 2 is a vertical elevation, partly in section, of a suitable sintering or heat-treating furnace;

Fig. 3 is a view of one form of swaging head which may be employed to mechanically work the sintered material;

Fig. 4 is a view of an electrolytic rectifier employing a zirconium electrode; and Fig. 5 is a graph showing a step-curve representing approximately the working temperatures with reduction in diameter.

Zirconium metal in order to be suitable for mechanical working should be substantially free from impurities. Even though small amounts of certain impurities are permissible, I have found that the best results are obtainable if the metal is substantially free from carbon silica, oxides, and the like. A small quantity of iron or nickel does not seem to impair the working qualities of the metal, however, such materials affect the melting point of zirconium. The melting point of the material produced by me is about 2200° absolute.

Preparation of the powder

In preparing zirconium powder suitable for the purpose of this invention the process described and claimed in copending application Serial No. 618,544, filed February 12, 1923 assigned to the same assignee as the present invention, was substantially followed.

Some of the advantages to be gained by using this process are that accurate control of the purity of the reaction products can be secured and maintained through the employment of substantially pure starting materials. In addition the reaction products can be controlled so that they are soluble in either water or acids leaving after washing, a substantially pure metal powder. Furthermore, this process lends itself admirably to the production of metal powders of predetermined particle size, which is an important factor in connection with the subsequent operation of agglomerating heat-treating and mechanical deformation as I have found that a relatively coarse powder is preferable.

In accordance with the process described in the above mentioned application, zirconium powder is obtained by the reduction of zirconium oxide by calcium metal in the presence of calcium chloride, although I have found that a good grade of powder may be obtained by using calcium alone.

The zirconium oxide employed is especially prepared by igniting pure zirconium nitrate in an electric furnace to a temperature of about 750° C., which is high enough to destroy all the nitrate. The ignition is done in a fire clay crucible. It is important that the ignition be done in an electric furnace in order to avoid all carbon contamination. Care should also be taken that the pure nitrate does not become contaminated with silica. After ignition of the nitrate, the resulting oxide is sieved through a 150 mesh sieve in order to insure freedom from exceedingly coarse material.

The calcium chloride used is also especially prepared and is very pure and free from organic matter. Since it usually contains some ammonium chloride it should be ignited at about 500° C. for several hours in order to free it from this material. After drying it is ball-milled for several hours and then sieved through a 150 mesh sieve.

The calcium employed in the reaction should be free from such impurities as iron, silica and carbon, etc. The procedure followed by me in preparing the calcium for reduction in proper state of purity is to take a rod about 10 to 12 inches long and about 2 inches in diameter and by means of a coarse rasp file away the oxide and chloride layers covering the outside of the rod. The clean rod is then placed in a planer and small chips cut off, which are immediately placed in a stoppered bottle to avoid contamination by the atmosphere by such exposure. Unless this is done the carbonate formed by exposure to the air would be reduced to carbide during the reduction of the zirconium oxide, which carbide I have found detrimental to mechanical working.

In making the zirconium powder I use the following proportions, or multiples thereof, of the materials just mentioned: 250 grams of zirconium oxide, 250 grams of calcium, and 300 grams of calcium chloride. The amounts of calcium and calcium chloride are in considerable excess of the theoretical amounts represented by the following equation:

$$ZrO_2 + 2Ca + 2CaCl_2 = Zr + 2CaO + 2CaCl_2.$$

In making up a charge of the above materials the zirconium oxide is weighed out first into a bottle, then the calcium chloride is weighed separately and added, and lastly the calcium metal is weighed and added. After all of the ingredients have been placed in the bottle the latter is stoppered and then shaken until they are intimately mixed. The mixture is then ready to be inserted in the reduction bomb.

For the reduction of the zirconium oxide I prefer to employ a bomb of the type illustrated in Fig. 1. This bomb consists of a cylindrical casting 6 of an alloy of iron, chromium and nickel having a bottom 7, the height of the bomb being approximately twice its width. In order to make the bomb air tight, the open end portion of the bomb is tapered inside at 8 for about an inch from the top, and a tapered plug 9 of metal alloy of the same composition as the bomb is ground into the tapered opening in the bomb. Over the top of this plug is placed a screw threaded cap 11 formed of the same alloy as the bomb. The threads on the cap engage external threads 12 on the bomb. By turning the cap the stopper may be hermetically sealed in the bomb as well as rigidly secured therein. The taper of the plug is about 70°.

Within the bomb is placed a snugly fitting liner 13 made of low carbon Shelby tubing steel, which insures that the metal powder product will be substantially free from carbon, chromium and nickel contaminations from the bomb. The advantage of using an alloy of iron-chromium and nickel for the bomb and plug is that such material, is always free from rust. By using a liner such as described, it is easier to remove the reaction products.

The mixture of zirconium oxide, calcium and calcium chloride may be placed in the bomb and after the latter is hermetically sealed it is placed in a nichrome wound electric furnace and heated to a temperature of about 950° C., as measured by a pyrometer placed adjacent to the bomb. The temperature may be raised slowly or quickly, but I prefer to bring it to the maximum temperature in about four hours. After reaching a temperature of 950° C. the heating is continued at that temperature for about two hours. The furnace is then shut off and the bomb allowed to cool slowly.

After the bomb is thoroughly cool it is removed from the furnace and the cap removed. The liner and the charge therein may then be lifted from the bomb and the latter may then be employed for performing another reduction. The reaction products in the liner removed from the bomb are chiseled out and any large lumps ground up in a steel mortar. The charge is then washed with distilled water. The washing may be accomplished by placing the charge in a large jar and adding distilled water. The charge and water are vigorously stirred by a mechanical stirrer for thirty minutes. Unless a large quantity of water is employed and vigorous stirring resorted to the solution will become quite hot resulting in the zirconium becoming contaminated. The zirconium and calcium oxide are allowed to settle and the supernatant liquor decanted and fresh distilled water added. The solution is again vigorously stirred for about twenty minutes and again the zirconium and calcium oxide are allowed to settle and the supernatant liquor decanted. This operation is repeated about four times or until the supernatant liquor is quite clear after the zirconium and calcium oxide have settled.

The water washing treatments remove the calcium chloride. The removal of the calcium oxide is next effected by adding to the zirconium powder about two liters of distilled water and vigorously stirring while slowly adding from 250 to 300 cc. of concentrated nitric acid. After about five minutes of vigorous stirring the solution is diluted by adding about 10 liters more of distilled water. The zirconium is allowed to settle. This process is repeated three or more times or until substantially all of the calcium oxide has been removed.

Following this treatment, the zirconium precipitate is washed two or more times with distilled water to remove all of the nitric acid. The zirconium is then filtered on a suction filter and washed with alcohol and ether. Coarse material is removed from the zirconium powder by passing the latter through a 150 mesh sieve. The zirconium powder prepared as above stated is dark grey in color and relatively coarse, just passing through a 150 mesh sieve. I have found that a coarse powder is easier to fabricate. By controlling the amount of calcium chloride entering into the reaction, the coarseness of the powder may be regulated. When the metal is thoroughly dry it may then be agglomerated and heat-treated to obtain the same in a dense, coherent homogeneous condition.

*Agglomeration and heat-treatment*

A mold suitable in size to give a bar 8" long by ¼" by ¼" in cross-section is employed. The thoroughly dried powder is placed in the mold in suitable quantity and subjected to a pressure of about 112,000 pounds per square inch. The bar is removed from the mold and placed in a furnace like that illustrated in Fig. 2. The furnace is hermetically sealed and after the same has been thoroughly evacuated so that a vacuum is produced therein corresponding to about .01 of a mm. the agglomerated metal is subjected to heat-treatment in accordance with the following heating schedule:

| Amperes | Time in minutes |
|---------|-----------------|
| 100 | 10 |
| 150 | 1 |
| 200 | 1 |
| 250 | 1 |
| 300 | 12 |

The object in giving the pressed bar a long low temperature heat-treatment is to effect the thorough removal of the adsorbed and absorbed gases prior to raising the temperature sufficiently high to sinter the particles of metal together. This degasification step is set forth and claimed in copending application Serial No. 432,325, filed Dec. 21, 1920, assigned to the present assignee.

The last mentioned current of 300 amperes corresponds to approximately 90% of the current required to fuse the metal. In case the pressed bar does not readily take the initial current of 100 amperes, 40 amperes of current at about 200 volts is passed therethrough. Ordinarily, however, if the contact between the ingot and the clamps is good, there is no necessity of passing a high voltage amperage current. The vacuum pumps are kept in continuous operation throughout the heat-treatment.

The bar after heat-treatment will be found to be perfectly dense, coherent and homogeneous throughout and substantially free from oxide and other contaminating substances which affect the workability of the metal.

The bar is allowed to cool to approximately room temperature and then may be removed from the furnace for mechanically working The bar is of a slightly brown color and before heat-treatment has an apparent density of about 5.0 and after heat-treatment an apparent density slightly greater than 6.25. The bar shrinks approximately 6% during heat-treatment, however, the amount of shrinkage varies with the treatment to which it is subjected.

*Mechanically working the metal*

The sintered zirconium product in accordance with the foregoing process possesses the remarkable property of being extremely soft at low temperatures. This is important as it enables one to mechanically work the metal without detrimental loss occasioned by oxidation. As is well known, zirconium is extremely active and readily combines with oxygen, hydrogen, and the like. By being able to work the metal at a low temperature I have found it unnecessary to protect the metal from the atmosphere as the amount of oxidation is comparatively negligible.

In mechanically working the metal I prefer to employ a swaging machine such as that illustrated in Fig. 3. The bar is heated to approximately 950° C. and forced through the swaging machine, the bar is again heated to the same temperature and turned and then again passed through the swaging machine. The operation of swaging may be continued in 20 mil. steps of reduction in diameter until the bar is about 150 mils. in diameter. The bar may then be heated to about 900° C. and taken down in 10 mil. steps until it reaches a diameter of about 125 mils. The temperature of working may then be further reduced to about 800° C. and the swaging continued in ten mil. steps until the bar has reached a diameter of about 75 mils. The final swaging may be done at a temperature of 550° C. in 5 mil. steps until the bar is about 30 mils. in diameter which is the diameter required for wire useful as electrodes in electrolytic rectifiers illustrated in Fig. 4. A suitable swaging schedule is illustrated by the step-curves shown in Fig. 5.

The heating of the bar to obtain the desired temperature for swaging may be done in a gas furnace or other suitable furnace but preferably in a hydrogen furnace.

It is to be noted that in mechanically working the bar, the temperature of working is reduced as the bar is reduced in diameter and that the reduction steps are also decreased. That is to say the temperature at initial swaging is about 950° for a bar about 250 mils. in diameter and at final swaging only 550° for a wire about 30 mils. in diameter. Furthermore, the steps of reduction in the swaging dies are about 20 mils. initially and only 5 mils. at final swaging.

The coherent zirconium obtained in accordance with the foregoing process possesses the required valve action for use in electrolytic rectifiers. Its uses in the arts for various purposes will be obvious.

Modifications of the invention may occur to those skilled in the art, however, I contemplate all modifications which come within the scope of the invention as defined in the appended claims.

What is claimed is:

1. The process of producing formed articles of zirconium which comprises producing a relatively coarse metal powder of the metal, compacting the same, heating the compacted article to a low temperature in a high vacuo to substantially degasify the compacted metal powder, sintering the degasified article at a higher temperature approximating but below the fusion point thereof in the same high vacuo and thereafter subjecting the sintered article to mechanical deformation at temperatures approximating 800° C.

2. The process of producing zirconium in rod and wire form which comprises producing a relatively pure coarsely crystalline metal powder of the metal, compacting the metal powder, heating the compacted article at a low temperature in a high vacuo to substantially degasify the same, sintering the degasified metal powder at a higher temperature approximating but below the fusion point thereof in the same high vacuo and thereafter subjecting the sintered article to mechanical deformation at temperatures approximating 800° C. to elongate the sintered article, reducing the temperature as the elongation proceeds to approximately 550° C.

3. The method of forming bodies of zirconium which comprises the steps of preparing a substantially pure zirconium metal powder, compacting the metal powder, sintering the compacted powder in a continuously maintained high vacuo in such manner as to effect substantial elimination of the adsorbed and absorbed gas content of the powder prior to actual sintering thereof, and thereafter repeatedly working the sintered article at temperatures approximately 800° C. to the desired shape.

4. The method of forming bodies of zirconium which comprises the steps of preparing a substantially pure zirconium metal powder, agglomerating to compact form, heat-treating the compacted article in a high vacuo initially at a low temperature to effect entire degasification thereof and subsequently at a higher temperature to effect sintering and coalescing of the degasified metal powder to a coherent body, said two heating operations being conducted consecutively and without intervening exposure of the metal powder to deleterious gaseous absorption, and thereafter effecting mechanical deformation of the sintered body at elevated temperatures approximately 800° C.

5. The method of producing bodies of zirconium which comprises preparing a substantially pure metal powder, agglomerating the powder to a compact mass, degasifying the mass in a continuously maintained high vacuo at temperatures at which the metal does not combine with the liberated gases, further heating the degasified mass to a higher temperature to effect sintering thereof, in the same continuously maintained high vacuo without intervening exposure of the degasified metal powder to deleterious gaseous absorption, said higher temperature approximating but being below the fusion temperature of the zirconium metal, and thereafter repeatedly working the sintered mass at temperatures approximating 800° C.

6. In the process of manufacturing bodies of zirconium comprised of the steps of preparing a substantially pure zirconium metal powder, consolidating the same to compact form, heat treating the compacted article in a continuously maintained high vacuo in such manner as to effect substantial removal of adsorbed and absorbed gases therein prior to actual sintering thereof, and then mechanically working the sintered body at elevated temperatures to the desired sizes, the step of effecting the mechanical working of the sintered metal at temperatures initially approximating 800° C. thereafter at gradually reducing temperatures until the metal is being worked at temperatures approximating 500° C.

In testimony whereof, I have hereunto subscribed my name this 15th day of September, 1926.

WILLIAM PHILIP KIERNAN.